United States Patent Office 3,372,987
Patented Mar. 12, 1968

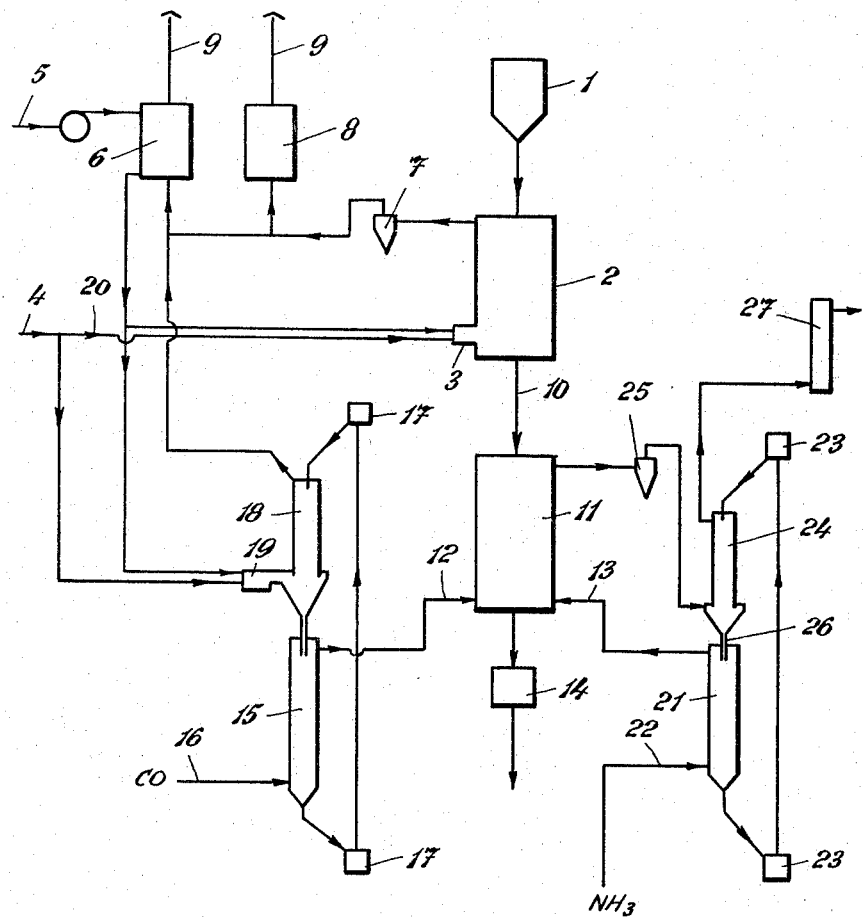

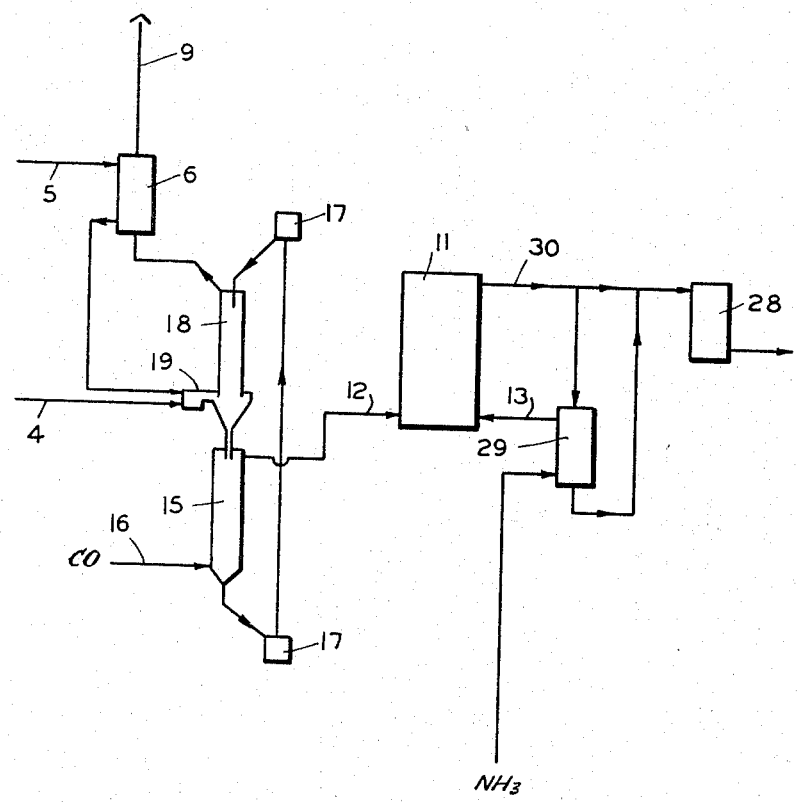

3,372,987
PREPARATION OF COMPOUNDS CONTAINING A CN LINKAGE
Hermann Kronacher, Trostberg, Upper Bavaria, Germany, assignor to Suddeutsche Kalkstickstoff-Werke Aktiengesellschaft and Dr. C. Otto & Comp. G.m.b.H., Trostberg, Upper Bavaria, and Bochum, Germany
Filed Dec. 24, 1964, Ser. No. 420,961
1 Claim. (Cl. 23—151)

ABSTRACT OF THE DISCLOSURE

In the preparation of —CN compounds from ammonia and carbon monoxide or hydrocarbons, the latter are preheated in contact with copper or copper alloys as circulating heat transfer material to a temperature above the reaction temperature and then passed with ammonia of lower temperature through the reaction zone whereby the temperature of said zone is controlled by the amount and temperature of the preheated carbon supplying gas.

---

This invention relates to a method of preparing compounds containing a CN bond.

There is an extensive literature on processes for the preparation of hydrocyanic acid by the catalytic reaction of CO and $NH_3$ according to the reaction $$CO + NH_3 = HCN + H_2O$$

In this reaction, the two gases are passed, in the temperature range of 500 to 700° C., over a catalyst, for instance over $Ce_2O_3$ and $V_2O_5$ on an alumina carrier; mostly, an excess of CO is employed. The reaction proper is carried out in a stationary bed or in a turbulence zone and does not present any difficulties, in contrast to the preceding and succeeding steps; said steps comprise particularly the preheating of the reaction gases and the economic utilization of the heat of the waste gases; such utilization is important because of the large CO excess employed and because of the large quantities of waste gases resulting from such excess.

Similar problems are encountered in the synthesis of white calcium cyanamide according to the summary equation $$CaO + 2CO + 2NH_3 = CaCN_2 + CO_2 + H_2O + 2H_2$$

from lime, carbon monoxide, and ammonia. In that process, granulated calcined lime is treated with a mixture of the reacting gases at temperatures of 800 to 900° C. either continuously or in a batch process, for instance also in a turbulence zone or in a rotary kiln.

In the synthesis of hydrocyanic acid as well as of white calcium cyanamide, the required temperature in the reactor may be obtained by external heating.

For several reasons, for instance because of the low heat conductivity of the refractory lining and of its gas permeability, such external heating meets with difficulties. Frequently, it is better to heat the reaction gases to reaction temperature before they enter the reactor.

It is a principal object of this invention to provide steps and means to minimize decomposition in the preheating of the reaction gases used for the preparation of compounds containing a CN linkage.

Other objects and advantages will be apparent from a consideration of the specification and claims.

The reactions referred to hereinabove require very pure gases. Particularly CO is employed in a concentration of about 90 percent, which concentration is otherwise hardly ever used in commerce; therefore, little is known about its manipulation, particularly about its heating up to high temperatures.

In the processes here involved it is of particular importance to avoid major proportions of $CO_2$ in the gases because carbon dioxide interferes with the hydrocyanic acid and cyanamide synthesis by shifting the equilibrium into the direction unfavorable for the desired products. Carbon produced by decomposition of CO produces carburization of metallic construction materials and renders them brittle and liable to breakage. The situation is aggravated by the fact that the required high reaction temperatures mostly compel to go to the limit of he allowable thermal stresses of the construction materials, particularly when the reactions are carried out under pressure.

Heating the ammonia presents particular difficulties. The decomposition to nitrogen and hydrogen starts already at 300° C. and increases with increasing temperature. On the other hand, any substantial losses of ammonia render the processes uneconomic. In addition, the hydrogen generated by the dissociation of ammonia causes in the cyanamide synthesis an unfavorable shifting of the reaction equilibrium.

The recited difficulties concerning the chemistry and material requirements are increased when it is intended to utilize the heat content of the gases leaving the reactor for heating the reaction gases.

Conventional heat exchange systems which have been used for gases having a low CO content and for reactions where the presence of impurities such as $CO_2$ is not harmful, have proven to be unsatisfactory for the reactions here involved. Good results have been obtained only by preheating one or all reaction gases by means of circulating solid heat transfer materials of high temperature. For preheating carbon containing gases, ceramic heat carriers are of advantage. By means of ceramic balls which were recycled and alternately heated and contacted with the gases to be heated, it has been possible to heat a gas containing more than 95° CO to 1200° C. without observing noticeable decomposition. The produced amount of $CO_2$ was less than 0.2 percent by volume.

Suitable ceramic heat transfer agents are, for instance, corundum, sillimanite, materials containing a high proportion of alumina, and the like.

With the same procedure, ammonia could be heated to 600° C. without splitting more than 2 percent thereof into nitrogen and hydrogen. It was, however, necessary to use materials which do not catalyze the decomposition of ammonia. Particularly suitable for this purpose are ceramic heat carriers which are impregnated with copper salts, or metallic heat carriers consisting of copper or copper alloys.

The synthesis of HCN from hydrocarbons and $NH_3$ or of nitriles may be carried out in the same way.

Calcium cyanamide can be produced in accordance with the invention in such a way that ammonia is heated separately by means of circulating solid heat transfer agents of a material which does not catalyze the $NH_3$ decomposition, to a temperature of at most 600° C., and then introduced into the reaction zone. The CO is also heated separately by means of circulating solid heat transfer agents so far above the reaction temperature that the mixed gases assume in the reaction zone the desired temperature.

In a modification of the method, the ammonia is heated only so far, for instance to a temperature of about 200 to 400° C., as this is possible without decomposition in recuperators of conventional construction materials; the CO is heated to a correspondingly higher temperature, which, using the principle of the solid heat transfer agents, presents no difficulties and can be carried out without any chemical decomposition which would interfere with the subsequent reaction of the gases.

In a third modification, ammonia is heated not at all or only very slightly while the carbon containing component is heated so far in excess of the reaction temperature that in mixing the gases the required reaction temperature is obtained. This modification results in simpler apparatus since a separate NH₃ heater is no longer required. This solution of the problem can be realized only with solid heat carriers for the carbon monoxide, not only to avoid decomposition thereof while within the lower temperature range but also because of the required high peak temperatures, which cannot be obtained otherwise. These considerations apply not only to the synthesis of white calcium cyanamide but also for the hydrogen cyanide synthesis and other high temperature reactions involving ammonia and carbon containing gases.

Heating fresh reaction gases with solid heat carriers presents also an easier way than other heat transfer procedures to utilize the heat of the waste gases for heating up the fresh gases. While it was not possible to obtain a satisfactory heat exchange between the hot waste gases and cold fresh gases in conventional heat exchangers, this could be accomplished by means of the solid heat transfer agents. In conventional heat exchangers, specific construction materials had to be used due to the risk of decomposition of the gases and because of the high temperatures; said materials could not withstand the unavoidable thermal stresses. Other procedures, which were attempted but need not be discussed in detail, were not successful either, except my novel procedure herein described.

The novel procedure will be now discussed by way of illustration in the following examples with reference to the accompanying drawings wherein FIG. 1 is a diagrammatic illustration of a plant for the manufacture of calcium cyanamide, and FIG. 2 is a similar view of a hydrocyanic acid plant.

In the figures, like reference numerals designate parts of the apparatus having similar functions.

*Example 1.—Calcium cyanamide*

Finely granulated lime is charged from hopper 1 into the lime kiln 2. A burner 3 at the lower end of the kiln burns gas introduced at 4 by means of air introduced at 5 and fed through a blower and an air preheater 6. The waste gases leave the kiln at the top over the dust collector 7, pass into the air preheater 6 and waste heat boiler 8 and leave the plant through the chimney 9. The calcined lime passes from the kiln 2 through line 10 into the synthesis reactor 11. At the lower end of the reactor, 95% CO (balance nitrogen) is introduced at 12 with a temperature of 950° C. At 13, ammonia is introduced with a temperature of 600° C. The produced calcium cyanamide is withdrawn at 14.

The carbon monoxide is introduced through line 16 at the bottom of the heater 15, which is filed with 4 mm. corundum pebbles, and heated therein. The pebbles flow out of the heater with a temperature of 200° C. and are recycled by means of the conveyor 17 into a vertical furnace 18 in which they are heated by combustion gases to a temperature of 1100° C. The heating gas is produced by burning in the combustion chamber 19 part of the gas introduced at 4 with part of the air preheated in chamber 6 and branched off at 20. The flue gas from the furnace 18 is also passed through the air heater 6 into the waste gas boiler 8.

The cold ammonia enters through line 22 and the lower part of the NH₃ heater 21 and is heated therein. The heat carrier in said heater consists of 4 mm. spherical Cuprodur granules which are recycled through the conveyor 23 into the heater 24. They are heated by means of the reaction gas which leaves the reactor 11 through the dust collector 25 and has a temperature of about 800° C. Said Cuprodur spheres enter the ammonia-heater through line 26 with a temperature of 700° C. The reaction gas coming from the reactor 11 leaves the heater 24 at its top and arrives with a temperature of 400° C. into the waste heat boiler 27 and subsequently into the plant processing the waste gas.

"Cuprodur" is the trade name of a high percent copper alloy marketed by Vereinigte Deutsche Metallwerke, Frankfurt am Main and has the following composition:

Cu about 97–98%
Si about 0.5–1%
Ni about 0.75–2%

The alloy does not contain manganese but copper and copper alloys containing up to 5–10% Mn are equally suitable as heat transfer agents.

*Example 2.—Hydrogen cyanide*

Reactor 11 is filled with a cerium-vanadium catalyst. The reaction gases are separately introduced at the bottom of the reactor, 95% CO through line 12 with a temperature of 750° C. and NH₃ through line 13 with a temperature of 200° C. The cold CO enters the CO heater 15 through line 16; the heater is filled with corundum pebbles. Said corundum pebbles are heated in the vertical furnace 18 to a temperature of 850° C. and pass continuously into the heater 15 from which they are continuously recycled into the furnace 18 by means of the conveyor 17. The gas for heating the furnace enters the combustion chamber 19 through line 4 and the necessary air is fed through line 5 and air preheater 6. The combustion gases leaving the furance 18 pass through the air preheater 6 to chimney 9. The reacted gases leave the reactor through line 30; part thereof passes through the heat exchanger 29 to preheat the entering ammonia and are then combined again with the other part and passed through cooler 28 into the plant for processing the gases where the formed HCN is recovered.

I claim:

1. In a method for the preparation of compounds containing a CN linkage by reacting ammonia and a carbon containing gas selected from the group consisting of hydrocarbons and carbon monoxide at elevated reaction temperature the steps which comprise heating in a heating zone a heat transfer material selected from the group consisting of copper and copper alloys to a temperature in excess of said elevated reaction temperature, passing said heated heat transfer material in contact with said carbon containing gas through a perheating zone, thereby imparting to said gas a temperature above said elevated reaction temperature, recycling said heat transfer material into said heating zone, passing the preheated carbon containing gas in mixture with ammonia having a temperature below said reaction temperature through a reacton zone, and adjusting the temperature and amount of said preheated carbon monoxide in said mixture so as to maintain said elevated reaction temperature in said reaction zone.

References Cited

UNITED STATES PATENTS 2,432,872  12/1947  Ferro _____ 23—151

OSCAR R. VERTIZ, *Primary Examiner.*

H. S. MILLER, *Assistant Examiner.*